(No Model.)
G. A. WAGNER.
FLOWER POT.
No. 262,335. Patented Aug. 8, 1882.
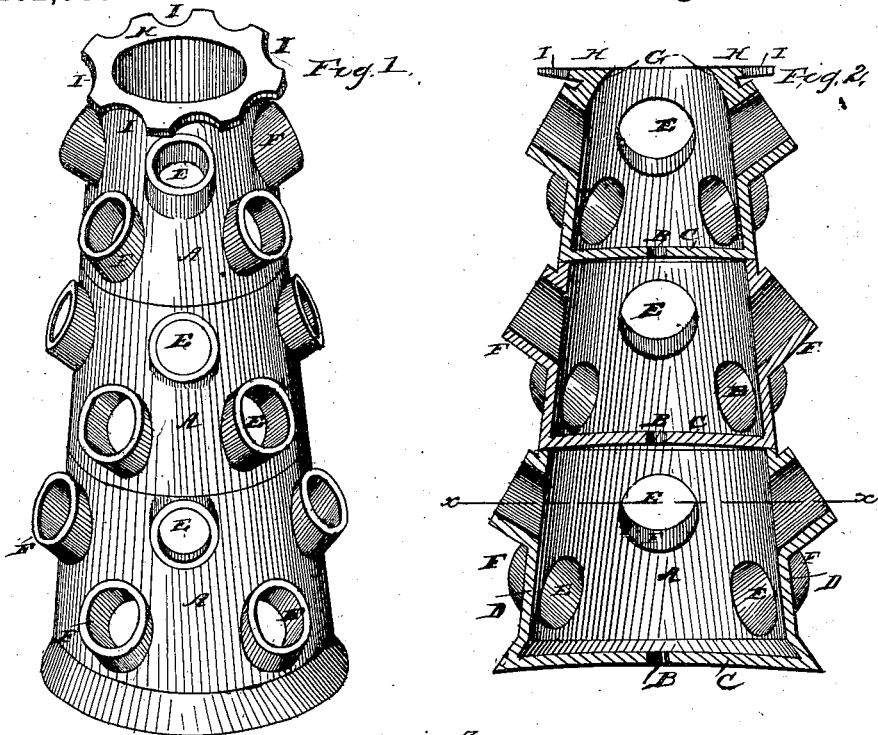
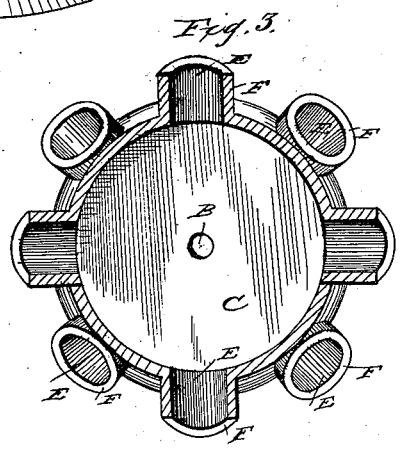
WITNESSES:
INVENTOR.
ATTORNEYS.

UNITED STATES PATENT OFFICE.

GEORGE A. WAGNER, OF WEISSPORT, PENNSYLVANIA, ASSIGNOR OF ONE-HALF TO NATHAN SOLT, OF SAME PLACE.

FLOWER-POT.

SPECIFICATION forming part of Letters Patent No. 262,335, dated August 8, 1882.

Application filed June 9, 1882. (No model.)

*To all whom it may concern:*

Be it known that I, GEORGE A. WAGNER, of Weissport, in the county of Carbon and State of Pennsylvania, have invented certain new and useful Improvements in Flower-Pots; and I do hereby declare that the following is a full, clear, and exact description of the invention, which will enable others skilled in the art to which it appertains to make and use the same, reference being had to the accompanying drawings, which form a part of this specification.

This invention relates to pots for the cultivation of berries, flowers, and like, and has for its object to provide a simple, durable, inexpensive, and efficient device of increased capacity, but occupying little space. To this end it consists in certain improvements in the construction and arrangement of parts.

In the drawings, Figure 1 is a perspective view of a series of my improved pots placed on each other in pyramid form; Fig. 2, a vertical sectional view thereof; and Fig. 3, a horizontal sectional view on the line $x\ x$, Fig. 2.

Referring by letter to the drawings, A designates a flower-pot of my improved construction, having the usual small opening, B, in its bottom C. The sides D of the pot are provided with one or more circumferential series of equidistant openings, E, which are surrounded by an outwardly and upwardly projecting flange, F, as shown. The series are formed one above the other, with the openings of one series on a vertical plane between the openings of the next series.

In practice the plants are adapted to grow through the openings E, the flange around the same serving to support the stem of the plant, and also forming a convenient downwardly-conducting tube through which water may be poured.

To utilize space the pots may be formed conical and of gradually-decreasing size, so that they may be placed one on another to form a pyramid, as shown in the drawings. Thus the pots may be separated for inspection or other purposes, and replaced with superior convenience and dispatch.

In some instances it is desirable to have the mouth of the pot convergent, as at G, Fig. 1, so that the overhanging sides will protect the roots of the plants growing out through the openings in the sides.

Plants may also grow out of the mouth of the pot, as usual, and the mouth may be provided with a horizontal circumferential flange, H, having curved recesses I in its edge, adapted to be grasped by the fingers in lifting. If desired, however, the plants might be trained upwardly in these recesses by securing them therein with a suitable band placed under the flange H.

The operation and advantages of the invention will be readily understood. It is convenient and simple, and presents a very neat and attractive appearance.

I claim and desire to secure by Letters Patent—

1. A pot for the cultivation of flowers, berries, and the like, the plants being adapted to grow through openings in the sides thereof, having a horizontal circumferential flange around its top, the edge of which is provided with curved recesses, as and for the purpose specified.

2. The combination of two or more pots of conical shape and gradually-decreasing size, provided with openings in their sides through which the plants are adapted to grow, and having suitable bottoms, the pots being adapted to be placed in the order of their size on one another, the uppermost one having a horizontal circumferential flange around its top, the edge of which is provided with curved recesses, as and for the purpose set forth.

In testimony that I claim the foregoing as my own I have hereto affixed my signature in presence of two witnesses.

GEO. A. WAGNER.

Witnesses:
EDWIN SOLT,
JOHN S. MILLER.